United States Patent [19]

Wolff

[11] 4,286,308
[45] Aug. 25, 1981

[54] APPARATUS AND METHOD FOR REDUCING HEADLIGHT GLARE

[75] Inventor: Otto E. Wolff, Weston, Mass.

[73] Assignee: Polaroid Corporation, Cambridge, Mass.

[21] Appl. No.: 72,059

[22] Filed: Sep. 4, 1979

[51] Int. Cl.³ .............................................. F21V 9/14
[52] U.S. Cl. ...................................... 362/19; 362/80; 362/248; 362/276; 362/359
[58] Field of Search ................... 362/19, 80, 248, 276, 362/359

[56] References Cited

U.S. PATENT DOCUMENTS 3,840,731  10/1974  Säufferer .............................. 362/19

Primary Examiner—Stephen J. Lechert, Jr.
Attorney, Agent, or Firm—John S. Vale

[57] ABSTRACT

An improved glare control system for use on a vehicle for reducing headlight glare from oncoming vehicles, the system being of the type wherein the headlights are rapidly switched between light emissive and non-emissive states and the operator views the roadway through a visor operating in synchronism with the headlights and being switchable between light transmissive and opaque states, and wherein the improvement includes means for measuring the glare intensity of the oncoming path and providing a proportional glare level signal and means responsive to the signal for varying the transmissive-to-opaque interval ratio of the visor cycle so that at least between upper and lower glare intensity limits the apparent density of the visor increases with increasing glare intensity and decreases with decreasing glare intensity.

9 Claims, 4 Drawing Figures

APPARATUS AND METHOD FOR REDUCING HEADLIGHT GLARE

BACKGROUND OF THE INVENTION

1. Field of the Invention

The present invention relates to the field of vehicle lighting systems and, more specifically, to a glare control system for reducing headlight glare from oncoming vehicles.

2. Description of the Prior Art

Headlight glare is a persistent safety hazzard in night driving and over the years many systems have been proposed to suppress headlight glare.

In general, the prior art systems fall into two broad categories. In the first, polarizing filters placed over the headlights polarize the emitted light at a 45° axis and a similar polarizing filter is used as a visor through which the operator views the roadway. When a similarly equipped vehicle approaches, the light emitted therefrom is cross-polarized with respect to the visor thereby reducing glare. For such a system to be effective, however, it must be adopted universally. Representative examples of the polarizing system may be found in U.S. Pat. Nos. 1,786,518; 2,230,262; and 2,423,321. Also see commonly-assigned U.S. Pat. No. 2,458,179.

The second type of glare control system may be referred to as the strobe type. In the strobe system, the headlight is rapidly flashed on and off, either electrically by interrupting power or electromechanically by providing an oscillating or rotating shutter in front of the headlights, and the operator views the roadway through a visor that is rapidly switched between light transmissive and opaque states in synchronism with the headlights. The headlights operate above the eye flicker rate and generally are on for a very short portion of the headlight cycle. For example, the headlight may be turned on for 10% of the cycle and be off for 90%. The visor is transmissive while the headlight is on and then is rapidly switched to the opaque state while the headlight is off. Obviously, the light output of the headlight must be 10 times greater than normal to provide sufficient illumination. Because the visor is transmissive for only 10% of the visor cycle, headlight glare from oncoming vehicles is reduced by 90%. Despite the complexity of the strobe system, it has a major advantage in the fact that it need not be universally adopted to provide the benefit of glare suppression.

For representative examples of early strobe type systems, reference may be had to U.S. Pat. Nos. 2,131,888; 2,139,707; and 2,755,700. A more contemporary version of the strobe type glare reduction system may be found in The National Highway Traffic Safety Administration Report PB-257-431 of September 1976 entitled "Advanced Headlighting Systems". The visor used in that system is of the electro-optical type, such as the PLZT shutter described in U.S. Pat. No. 3,245,315.

While both the polarizing and strobe type glare control systems are effective to reduce glare, the inherent light transmission losses of those systems generally tend to deprive the vehicle operator of the benefit of supplemental ambient illumination provided by streetlights especially when there is no vehicle approaching or when the glare intensity is relatively low from oncoming vehicles off in the distance.

The polarizing system described in the previously noted U.S. Pat. No. 2,230,262 addresses the problem by configuring the headlight and visor filters in venetian blind arrays that are switched between closed and opened positions in accordance with the glare intensity of the oncoming path as measured by a photoelectric glare level detector mounted on the front of the automobile. When the glare level is above a predetermined limit, the filters are closed for maximum glare reduction. When the glare intensity falls below the limit, the filters are opened to take advantage of ambient illumination. However, because this is a bistable system (the filters are either opened or closed) which does not adjust proportionally to variations in glare intensity, it would seem that the abrupt changes in perceived roadway illumination may prove tiring to the vehicle operator.

The strobe type systems in the prior art generally do not make any provision for varying the system response in accordance to glare intensity and the transmissive-to-opaque time ratio of the visor cycle is fixed to coincide with the light emitting and nonemitting intervals of the headlight cycle for maximum glare reduction.

Therefore, it is an object of the present invention to provide an improved glare control system of the strobe type that is responsive to the actual glare intensity of the oncoming path and is automatically adjustable to vary the transmissive/opaque ratio of the visor in accordance with glare intensity so that the vehicle operator may benefit from ambient illumination at appropriate times.

It is another object of the invention to provide a method of reducing headlight glare wherein said ratio is adjusted to vary the apparent density of the visor in accordance with the measured glare intensity of the oncoming path.

Other objects of the invention will, in part, be obvious or will, in part, appear hereinafter.

SUMMARY OF THE INVENTION

The present invention provides an improved glare control system usable on a vehicle for reducing headlight glare from oncoming vehicles traveling along an adjacent path of travel. The system is of the type including a headlight for illuminating the vehicle's path of travel; means for operating the headlight cyclically at a fixed frequency with each headlight cycle consisting of a fixed light-emitting interval followed by a fixed nonemitting interval; a visor switchable between light transmissive and opaque states for, respectively, unblocking and blocking the operator's view of his vehicle's path of travel and the adjacent path of travel; and visor switching means operating cyclically in synchronism with the headlight cycle for automatically switching the visor to the transmissive state for a transmissive interval that coincides with the headlight emitting interval and thereafter being responsive to a visor modulation signal for switching the visor to the opaque state.

The improvement includes means for measuring the headlight glare intensity of the adjacent path of travel and providing a glare level signal that is proportional to the measured intensity; and means responsive to the glare level signal for selectively providing the modulation signal to the visor switching means to automatically adjust the transmissive-to-opaque interval ratio of the visor cycle in accordance with measured glare intensity so that at least between predetermined upper and lower glare intensity limits the apparent density of the visor increases with increasing glare intensity and decreases with decreasing glare intensity.

When the glare level falls below the lower limit, the modulation signal is withheld so the visor remains in the transmissive state for the entire visor cycle. When the measured glare intensity exceeds the upper limit, the ratio is set at a minimum for maximum glare reduction.

Preferably, the response of the system is set to progressively adjust the ratio so that the apparent density of the visor increases at a rate lower than the rate of increase of measured glare intensity and the headlights of an oncoming vehicle appear to become progressively brighter when viewed through the visor to aid the vehicle operator's perception of the oncoming vehicle's velocity and distance.

The present invention also provides a method of reducing headlight glare wherein the transmissive-to-opaque interval ratio of the visor cycle is varied in the manner described above.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
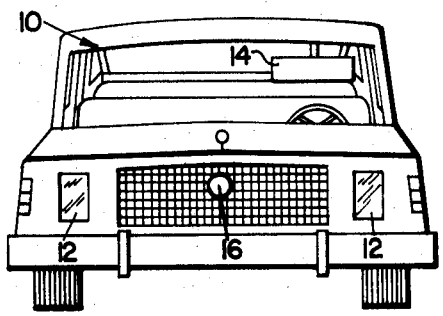
FIG. 1 is a perspective view of an automobile showing selected components of the improved glare control system thereon.
Figure 2:
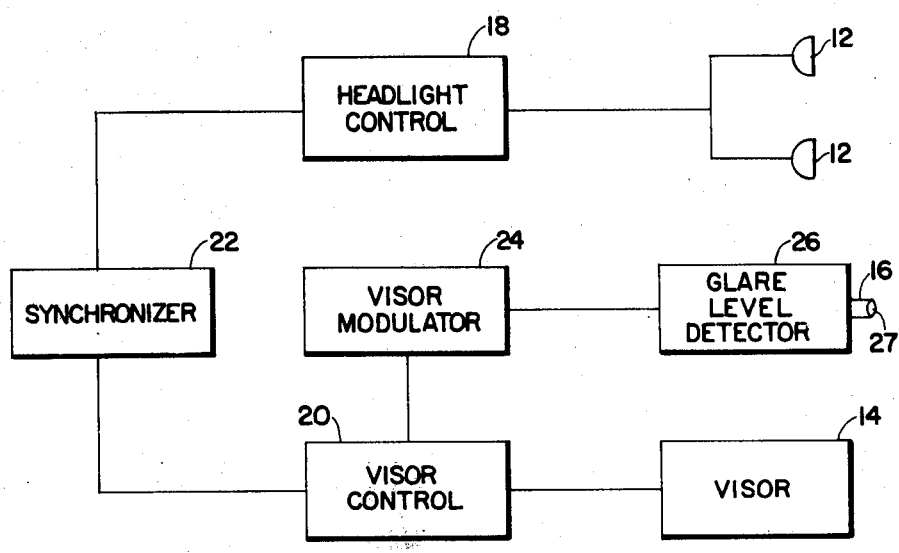
FIG. 2 shows the improved glare control system embodying the present invention in block diagram form.

Referring to FIGS. 1 and 2, the improved glare control system embodying the present invention is usable on a vehicle, such as the illustrated automobile 10, for reducing headlight glare from oncoming vehicles traveling along an adjacent path of travel, i.e., the oncoming lane of a divided highway to the left of the vehicle's path of travel.

FIG. 1 shows certain system components mounted on automobile 10 including a pair of headlights 12 that are adapted to be rapidly switched between light emitting and non-emitting states for illuminating the vehicle's path of travel; an electrically operated visor 14, positionable in the operator's field of view for night driving and selectively switchable between light transmissive and opaque states in synchronized relation with the headlights 12, for selectively unblocking and blocking the operator's view of his vehicle's path of travel and the adjacent oncoming path, and a sensor 16, preferably a photoelectric device mounted on the front of automobile 10, forming part of a glare level detector for measuring the headlight glare intensity of the oncoming path.

Unlike the prior art systems wherein the visor is transmissive only when the headlights are on and opaque when the headlights are off to block glare, the present system additionally includes means for varying the transmissive to opaque time ratio of the visor's duty cycle in accordance with the glare intensity level of the adjacent path to take advantage of supplemental ambient illumination provided by street lights and the like.

When the glare level is below a predetermined lower limit or threshold, the visor 14 is maintained in the transmissive state for the entire visor duty cycle providing the operator with the benefit of the supplemental ambient illumination. As an oncoming vehicle approaches and the glare level exceeds the minimum threshold, the system automatically adjusts the ratio by progressively increasing the opaque interval of the visor cycle with increasing glare intensity to progressively increase the apparent density of the visor. The effect is similar to varying the density of an optical filter in front of the operator in accordance with glare level. When the glare level exceeds an upper predetermined limit, the opaque interval is automatically set at a maximum so that the visor 14 is transmissive only when the headlights 12 are on thereby providing maximum glare reduction.

The improved system is shown in block diagram form in FIG. 2. The headlights 12 are operated cyclically at a fixed frequency by headlight control circuit 18. To avoid strobe effects, the operating frequency should be above the flicker rate and preferably 50 Hz or above.

Each headlight cycle begins with a relatively short on or light-emitting interval followed by a relatively long off or nonemitting interval. Typically, the on interval would be set at between 5%–10% of the total headlight cycle. This means, of course, that the light output of headlights 12 must be from 10–20 times higher than standard headlights to provide equivalent illumination.

In the interests of conserving electrical power, the preferred method for flashing the headlights 12 is to electrically turn them on and off. At the present time, a high pressure, short arc gaseous discharge lamp, such as a xenon strobe lamp, is the most suitable choice for the headlights 12. Headlight control circuit 18 then would take the form of a solid state switching or pulsing circuit for periodically interrupting the flow of electrical power to headlights 12. Alternatively, headlights 12 may be of the high intensity metal halogen type which operate continuously and an electromechanical shutter, such as a rotating sector blade, may be provided in front of each headlamp 12 for selectively blocking and unblocking light emission to establish the desired intermittent light emission. In this instance, headlight control circuit 18 would electrically drive the shutters at the preferred frequency to set the indicated fixed headlight duty cycle.

Although only two headlights 12 are shown, vehicle 10 may be equipped with four headlights to provide a high and low beam capability. Alternatively, the high and low beam feature may be built into each of the illustrated lamps 12.

The visor 14 operates cyclically, at the same frequency as the headlights 12, under the control of a visor control circuit 20 which is operable to switch visor 14 between its light transmissive and opaque states. The duty cycles of the headlights 12 and visor 14 are synchronized by a synchronizer circuit 22 coupled to both headlight control circuit 18 and visor control circuit 20. At the beginning of each synchronized cycle, visor control circuit 20 automatically switches visor 14 to the light transmissive state for a fixed transmissive interval that coincides in time with the headlight on or emissive interval so that the operator may view his vehicle's path of travel through visor 14 by light reflected from headlights 12 and any significant ambient illumination. After the initial fixed transmissive interval, visor control circuit 20 is actuable, during the balance of the visor's duty cycle, to switch visor 14 to the opaque state upon receipt of a visor modulation signal provided by a visor modulating circuit 24 coupled to visor control circuit 20.

As will be explained later, visor modulating circuit 24 is responsive to glare level signals provided by a glare level detecting circuit 26 which is formed in part by sensor 16 and is coupled to visor modulating circuit 24. The signals provided by detecting circuit 26 are indicative of the glare intensity level of the oncoming path and are used to control modulating circuit 24 so that it either withholds the modulating signal from control circuit 20 to maintain the visor 14 in its transmissive state for the entire cycle or alternatively adjusts the timing of the modulation circle to vary the transmissive-to-opaque ratio.

In a preferred embodiment, visor 14 is an electro-optical light valve or shutter mechanism that may be electrically switched rapidly between the transmissive and opaque states.

One type of electro-optical shutter suitable for use in the improved system is a PLZT shutter comprising a pair of spaced cross-polarizing sheets and a PLZT crystal therebetween to which a high voltage electrical field is selectively applied. When there is no electrical field applied, the device is in an opaque state because the crossed polarizing sheets block incident light. When the field is applied to the crystal, however, it has a property of rotating the plane of polarization of the light transmitted through the front polarizer 90° so that the plane is now aligned with the rear polarizer thereby causing the shutter to be light transmissive. Advantageously, the shutter may be switched very rapidly between the light transmissive and opaque states. The polarizing sheets preferably are configured to be more transmissive to low wavelength light so that when crossed they block most of the light in the headlight spectrum but transmit in the red region so as not to block the operator's view of the taillights of vehicles in front of him.

When such a PLZT visor 14 is utilized, the visor control circuit 20 is essentially a switching circuit that automatically switches the visor 14 to its transmissive state in synchronism with the headlight on interval. Following this fixed transmissive interval, it is then responsive to a modulation signal provided by the modulating circuit 24 to switch visor 14 to its opaque state during the balance of the visor cycle which coincides with the headlight off interval.

Alternatively, visor 14 may be an electromechanical device having blades or vanes arranged in venetian blind fashion that are electrically driven between light blocking and unblocking positions. In this instance, visor control circuit 20 would be configured to control the operation of such an electromechanical visor.

The glare level detecting circuit 26 provides a direct measurement of the headlight glare intensity in the oncoming path of travel. To limit the field of view of the sensor 16 to a selected region of the oncoming path in front of the vehicle, a suitable optical system or lens 27 is provided to focus light emanating from the region onto the photoelectric sensor 16. Detecting circuit 26 is configured in a well-known manner to provide an output signal that is directly proportional to the glare intensity level of the oncoming path. The output signal to modulating circuit 24 may take the form of a voltage level that increases in direct proportion to glare intensity level or, alternatively, it may supply this information in binary coded digital form.

Visor modulating circuit 24 is responsive to the measured glare intensity signals and may be configured as a pulse width modulator for varying the width of the visor switching pulses provided by visor control circuit 20. When the glare level signal indicates that the glare intensity is below a lower threshold limit, such as when there is no car in the oncoming lane, modulating circuit 24 responds by withholding the modulating signal from visor control circuit 20 thereby maintaining visor 14 in its transmissive state for the entire visor cycle. As the measured glare intensity increases, modulating circuit 24 responds by timing the modulation signal to progressively increase the opaque interval with increasing glare intensity and thereby increase the apparent density of visor 14. When the glare level signal indicates that glare intensity is above a predetermined upper limit, such as when an oncoming automobile is fairly close, modulating circuit 24 provides the modulation signal immediately following the fixed transmissive interval establishing a maximum opaque interval in the visor's duty cycle for maximum glare reduction.

Figure 3:
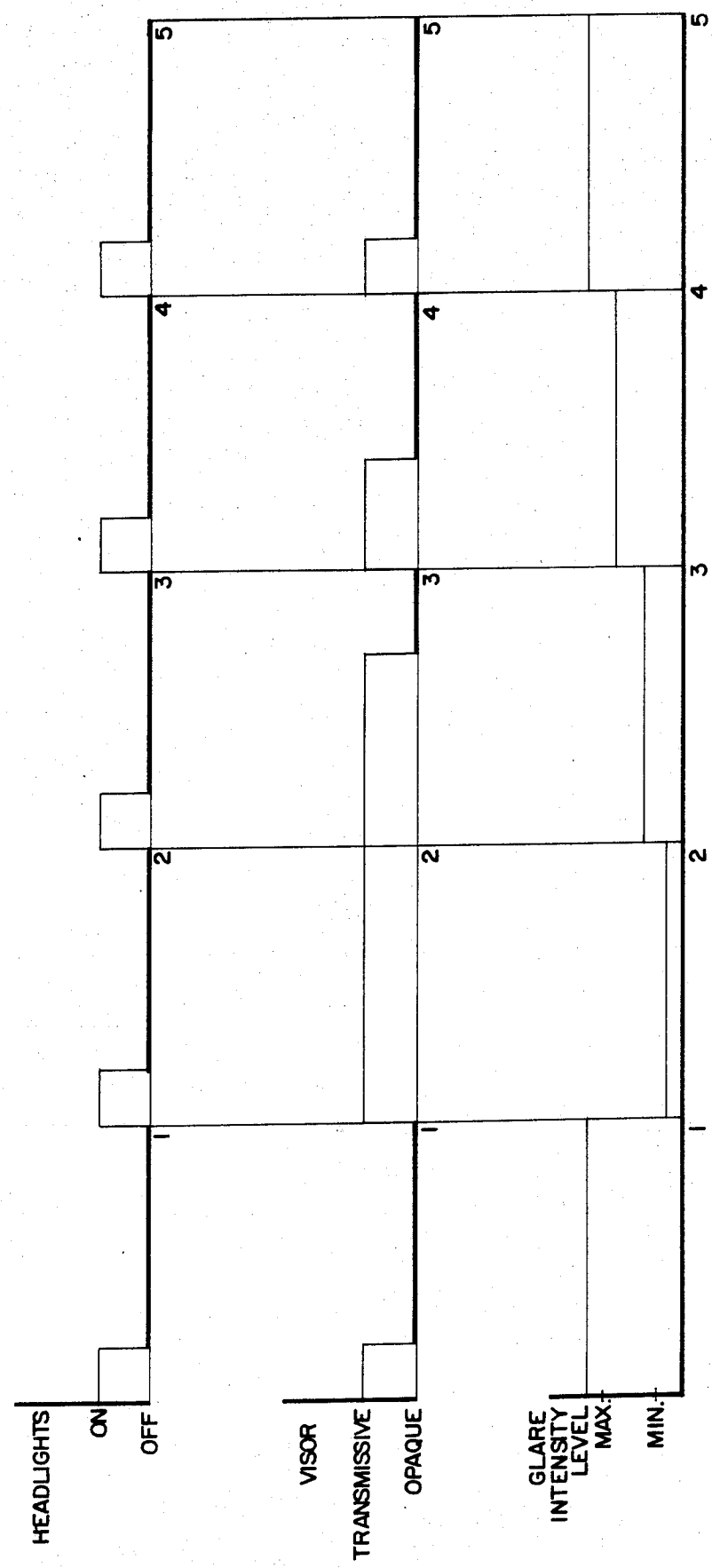
FIG. 3 shows in graphical form the states of the headlights and visor for various measured glare intensities.

The operation of the improved glare control system may be more clearly explained with reference to FIG. 3. The three graphs therein show the measured glare intensity level and the status of the headlights 12 and visor 14 for five sequential periods. The first period is indicative of a single oncoming vehicle that is fairly close so that the glare intensity is above the upper limit. The next period shows conditions when that automobile has passed and there are no oncoming vehicles close enough to create a glare level that is above the minimum threshold. The next three periods are intended to show the progressive increase of glare intensity from a second oncoming car so that the last period is a duplicate of the first period. Within each period, only one cycle of headlight and visor operation is shown for illustrative purposes.

When the oncoming vehicle is very close, the glare intensity measured by circuit 26 is above the predetermined upper limit and the visor 14 is only transmissive for the headlight on interval. The modulation signal is provided by circuit 24 immediately following the headlight on interval and switches the visor 14 to the opaque state for the maximum opaque interval. If the headlight is on or emitting for 5% of its duty cycle, the visor is effective to block 95% of the incident headlight glare. Because the headlights 12 are pulsed to emit high intensity flashes at a frequency above the eye flicker rate, the oncoming driver sees what appears to be a continuously emitting headlight of normal intensity. To the driver of the vehicle equipped with the glare control system, the oncoming headlight appears to be of substantially reduced intensity.

When the oncoming vehicle has passed, the glare intensity measured by circuit 26 drops below the predetermined lower threshold level and modulating circuit 24 responds to the appropriate signal provided by circuit 26 by withholding the modulation signal from visor control circuit 20. At the beginning of the synchronized cycles, the visor 14 is automatically set to its transmissive state and the withholding of the modulation signal for the balance of the visor cycle merely maintains visor 14 in its transmissive state to allow the operator to benefit from the supplemental ambient roadway illumination.

As the next vehicle approaches off in the distance, during the third time period shown in the graphs, the measured glare level rises above the lower limit. In response to this fairly low level signal from circuit 26, the modulating circuit 24 provides the modulation signal to circuit 20 fairly late in the visor duty cycle to provide a moderate amount of glare reduction. Typically, for such a low glare level the transmissive-to-opaque ratio will be above 1.0. That is, visor 14 will remain transmissive for more than half the visor's duty cycle and the apparent density of the visor is fairly low.

As the oncoming vehicle comes closer and the glare intensity level increases, modulator circuit 24 responds to the proportional output signal of the detecting circuit 26 and progressively increases the opaque interval. This is shown in the fourth segment of the graph where the glare level is in the upper portion of the range but below the upper limit with the opaque interval increased sufficiently to set the transmissive-to-opaque ratio below 1.0.

When the oncoming vehicle is close enough to cause the glare level to go above the upper limit, the opaque interval is once again set at the maximum as indicated in the fifth graph segment.

If the system is set so that the transmissive-to-opaque ratio is varied in direct proportion to the change in glare level intensity, the oncoming headlights, as viewed through visor 14, will appear to be of constant intensity or brightness. While it is highly desirable to reduce glare, the vehicle operator may not be able to accurately perceive the velocity and/or distance of the oncoming vehicle because, to a degree, at night these parameters are perceived by the rate of change of headlight brightness. Therefore, in a preferred embodiment of the present invention, it is desirable to set the response of the system so that the headlights of the oncoming vehicle appear to be progressively brighter as it comes closer.

Figure 4:
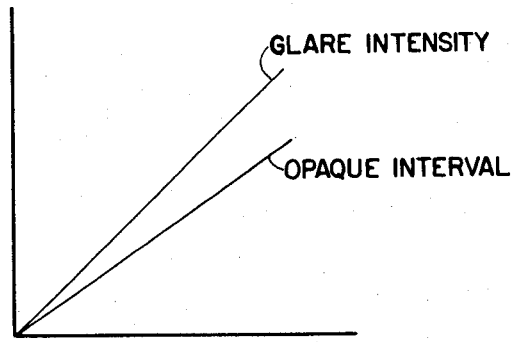
FIG. 4 graphically illustrates how the visor opaque interval changes with respect to increasing glare intensity.

As best shown in FIG. 4, the response of the system is preferably set so that the increase of the opaque interval to adjust the transmissive-to-opaque ratio changes at a lower rate than the detected increase in glare intensity. The graph in FIG. 4 shows the measured glare intensity from an oncoming vehicle increasing linearly along a line having a slope of approximately 1. The second line is indicative of the progressive linear increase in the opaque interval of the visor duty cycle having a slope that is less than 1. Because the glare intensity increases at a faster rate than the opaque interval, the apparent brightness of the oncoming headlights as viewed through the visor 14 also increases as the oncoming vehicle comes closer to aid velocity and distance perception. It should be noted that the linear aspects of the graph shown in FIG. 4 are merely to indicate that the response of the glare control system is set to vary the apparent density of the visor at a different rate than the increase in glare intensity and is not intended to be indicative of actual nighttime driving conditions.

One advantage of the present glare control system is that it does not require universal adoption. It provides glare reduction benefits to the driver of a vehicle so equipped whether or not oncoming vehicles have a similar system. However, as more vehicles adopted such a system, similarly equipped oncoming vehicles might produce annoying stroboscopic interference. To minimize such effects, the headlights and visors would be equipped with appropriate polarizers, preferably set at 45°, as is well known in the art. Obviously, this would require extra output from the headlamps.

Because certain changes may be made in the above glare reduction system without departing from the scope of the invention herein involved, it is intended that all matter contained in the above description or shown in the accompanying drawings shall be interpreted as illustrative and not in a limiting sense.

I claim:

1. An improved glare control system usable on a vehicle for reducing headlight glare from oncoming vehicles traveling along an adjacent path of travel, said control system including a headlight for illuminating the vehicle's path of travel, means for interrupting the light output of said headlight cyclically at a fixed frequency with each headlight cycle consisting of a fixed light emissive interval followed by a fixed nonemissive interval, a visor switchable between light transmissive and opaque states for, respectively, unblocking and blocking the operator's view of his vehicle's path of travel and said adjacent path of travel, and visor switching means operating cyclically in synchronism with said headlight cycle for automatically switching said visor to said transmissive state for a transmissive interval that coincides with said headlight emissive interval and thereafter being responsive to a visor modulation signal for switching said visor to said opaque state wherein said improvement comprises:

means for measuring the headlight glare intensity of said adjacent path of travel and providing a glare level signal that is proportional to the measured intensity; and means responsive to said glare level signal for selectively providing said modulation signal to said visor switching means to automatically adjust the transmissive-to-opaque interval ratio of the visor cycle in accordance with measured glare intensity so that at least between predetermined upper and lower glare intensity limits the apparent density of said visor increases with increasing glare intensity and decreases with decreasing glare intensity.

2. The improved glare control system of claim 1 wherein the response of said modulation signal providing means is set to progressively adjust said ratio so that the apparent density of said visor increases at a rate lower than the rate of increase of glare intensity indicated by said glare level signals and the headlights of an oncoming vehicle appear to become progressively brighter when viewed through said visor.

3. The improved glare control system of claim 1 wherein said modulation signal providing means withholds said modulating signal from said visor switching means when said glare level signal indicates said measured glare intensity is below said lower limit so that said visor remains in said transmissive state for said entire visor cycle.

4. The improved glare control system of claim 3 wherein said modulation signal providing means provides said modulating signal immediately after said transmissive interval when said glare level signal indicates said measured glare intensity is above said upper limit so that said ratio is set at a minimum for maximum glare reduction.

5. An improved glare control system usable on a vehicle for reducing headlight glare from oncoming vehicles traveling along an adjacent path of travel, said control system including a headlight for illuminating the vehicle's path of travel, means for interrupting the light output of said headlight cyclically at a fixed frequency with each headlight cycle consisting of a fixed light emissive interval followed by a fixed nonemissive interval, a visor switchable between light transmissive and opaque states for, respectively, unblocking and blocking the operator's view of his vehicle's path of travel and said adjacent path of travel, and visor switching means operating cyclically in synchronism with said headlight cycle for automatically switching said visor to said transmissive state for a transmissive interval that coincides with said headlight emissive interval and thereafter being responsive to a visor modulation signal for switching said visor to said opaque state wherein said improvement comprises:

means for measuring the headlight glare intensity of said adjacent path of travel and providing a glare level signal that is proportional to the measured intensity; and means responsive to said glare level signal for selectively providing said modulation signal to said visor switching means to vary the opaque interval and thereby adjust the transmissive-to-opaque interval ratio of said visor cycle in accordance with measured glare intensity so that when said glare intensity is below a predetermined lower limit said modulation signal is withheld and said visor remains in said transmissive state for the entire visor cycle, as said glare intensity progressively increases above said lower limit said opaque interval is progressively increased proportionally to decrease said ratio, and when said measured intensity exceeds a predetermined upper limit said opaque interval is set at a maximum thereby establishing said ratio at a minimum for maximum glare reduction.

6. The improved glare control system of claim 5 wherein the response of said modulation signal providing means is set to progressively increase said opaque interval at a rate lower than the rate of increase of glare intensity indicated by said glare level signals so that the headlights of an oncoming vehicle will appear to become progressively brighter when viewed through said visor.

7. A method of reducing headlight glare from oncoming vehicles traveling along an adjacent path of travel comprising the steps of:

periodically interrupting the light output of a vehicle's headlight so it operates cyclically at a fixed frequency with each headlight cycle consisting of a fixed light emissive interval followed by a fixed nonemissive interval;

providing a visor that is cyclically switchable between light transmissive and opaque states for, respectively, unblocking and blocking the vehicle operator's view of his vehicle's path of travel and said adjacent path of travel and is adjustable to vary the transmissive-to-opaque interval ratio of a visor cycle to change the apparent density of the visor;

operating said visor cyclically in synchronism with said headlight cycle so that said visor is automatically switched to said transmissive state for a transmissive interval that coincides with said headlight emissive interval and thereafter is switchable to said opaque state;

measuring the headlight glare intesity of said adjacent path of travel; and varying said transmissive-to-opaque interval ratio in accordance with the measured glare intensity level by selectively switching said visor to said opaque state so that at least between predetermined upper and lower glare intensity limits the apparent density of said visor increases with increasing glare intensity and decreases with decreasing glare intensity.

8. The method of claim 7 further including the steps of switching said visor to said opaque state immediately following said transmissive interval when said measured glare intensity is above said upper limit so said visor has maximum apparent density and maintaining said visor in said transmissive state for the entire visor cycle when said measured glare intensity is below said lower limit so said visor has minimum apparent density.

9. The method of claim 7 wherein said ratio is varied so that the apparent density of said visor progressively increases at a rate lower than the rate of increase of measured glare intensity thereby causing the headlights of an oncoming vehicle to appear progressively brighter when viewed through said visor.

* * * * *